United States Patent Office.

SAMUEL M. FARNHAM, OF TULLY, NEW YORK.

Letters Patent No. 77,021, dated April 21, 1868.

IMPROVED OIL OR POLISH FOR LEATHER.

The Schedule referred to in these Letters Patent and making part of the same.

TO ALL WHOM IT MAY CONCERN:

Be it known that I, SAMUEL M. FARNHAM, of Tully, in the county of Onondaga, and State of New York, have invented a new and useful Improved Fluid Oil-Polish for Leather; and I do hereby declare that the following is a full, clear, and exact description of the same.

This composition is intended for application to boots, shoes, harness, and other leather-work, for the purpose of rendering the leather impervious to water, and at the same time affording a base which is susceptible of receiving a high polish, preserving, also, the flexibility of the leather.

The employment of resinous substances as a coating for leather has been objectionable, because such resinous substances, on becoming dry, would crack, and cause the leather to break. I have ascertained that by mixing glycerine with a resinous compound, an article would be produced meeting all the requirements, viz, the exclusion of water, the preservation of the softness of the leather, and the susceptibility of the compound to receive a high polish.

The following description will enable persons skilled in the art to make my improved preparation:

Take of alcohol, (ninety-four per cent.,) one gallon; Venice terebinthina, one pound; gum-shellac, one pound; glycerine, one pound; myrtle-wax, one-fourth pound, and of fine lamp or ivory-black, enough to give the requisite color and consistency.

Digest the gum in the alcohol until thoroughly dissolved. A portion of the glycerine is used in grinding the myrtle-wax, and a portion in grinding the blacking, so as to make it perfectly soluble in the alcohol. The ingredients, after being mixed, must be stirred until a perfect union is effected. The composition is to be applied to the leather with a brush or sponge, in the usual manner.

Oil ricini may be used with the glycerine resin, for carriage-tops and other work where a brilliant polish is not required.

What I claim as my invention, and desire to secure by Letters Patent, is—

A composition compounded from glycerine, resinous and other substances, substantially as and for the purpose set forth.

In testimony whereof, I have signed my name to this specification in the presence of two subscribing witnesses.

SAMUEL M. FARNHAM.

Witnesses:
    JAMES N. BUTLER,
    KIRTLAND C. ARNOLD.